(12) United States Patent
McLain et al.

(10) Patent No.: US 6,788,868 B2
(45) Date of Patent: Sep. 7, 2004

(54) FIBER OPTIC MODULE CONNECTOR CLEANING SLIDE

(75) Inventors: Dennis McLain, Duluth, GA (US); Frank F. Eichenlaub, Jr., Highlands Ranch, CO (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 10/324,636

(22) Filed: Dec. 20, 2002

(65) Prior Publication Data

US 2004/0022514 A1 Feb. 5, 2004

Related U.S. Application Data

(60) Provisional application No. 60/343,295, filed on Dec. 22, 2001.

(51) Int. Cl.[7] .................................................. G02B 6/00

(52) U.S. Cl. ......................................................... 385/134

(58) Field of Search ................................. 385/134, 135, 385/136, 137; 439/668, 331, 131, 133, 135, 136, 147

(56) References Cited

U.S. PATENT DOCUMENTS

| 4,600,258 | A | * | 7/1986 | Hu ............................. 439/140 |
| 4,684,245 | A | * | 8/1987 | Goldring ...................... 356/41 |
| 5,224,868 | A | * | 7/1993 | Tseng .......................... 439/136 |
| 5,299,943 | A | * | 4/1994 | Shieh .......................... 439/136 |
| 6,003,775 | A | * | 12/1999 | Ackley ................... 235/472.01 |
| 6,208,796 | B1 | * | 3/2001 | Williams Vigliaturo ..... 385/135 |
| 6,533,616 | B2 | * | 3/2003 | Johnsen et al. ............. 439/668 |
| 6,595,423 | B2 | * | 7/2003 | Cho et al. .............. 235/472.01 |

* cited by examiner

Primary Examiner—Tulsidas C. Patel

(57) ABSTRACT

A slidable planer window cover that secures an optical connector in a fiber optic module. The cover is notched to form a rectangular opening, the notch defining two adjoining sides of the rectangle, a base and a base cover forming the other two sides. The window cover is slotted to allow a screw to pass through from the outside—with respect to the module—and be secured to the base on the other side. When the screw is tightened against the window cover, sliding motion is restrained. Flexible clips on opposing sides of the connector retain the connector within the rectangular opening when the window cover is secured by the screw in a closed position. When the screw is loosened, a removal tab on the window cover facilitates sliding the cover to the extent allowed by the screw, to enlarge the opening thereby facilitating removal of the connector.

20 Claims, 3 Drawing Sheets

FIBER OPTIC MODULE CONNECTOR CLEANING SLIDE

CROSS REFERENCE TO RELATED APPLICATION

This application claims priority under 35 U.S.C. 119(e) to McLain, et al., U.S. provisional patent application No. 60/343,295 entitled "Module Fiber Optic Connector Cleaning Slide", which was filed Dec. 22, 2001, and is incorporated herein by reference.

FIELD OF THE INVENTION

This invention relates, generally, to communication networks and, more particularly, to providing maintenance access to modules at network nodes.

BACKGROUND

As broadband networks continue to move from the experimental realm to the order of the day for network and service providers, the competition-driven need for providers to reduce costs of implementation increases proportionally. Community Antenna Television ("CATV") has traditionally relied on metallic coaxial ("coax") cabling to deliver video signals. Increasingly, optical fiber networks are used to transport analog and digital information signals from a provider to subscribers. Connection is typically made to the network with a drop cable between the subscriber's premise equipment and a node mounted near the subscriber, the mounting method typically being strand mounted or pedestal mounted. In fiber to the home systems, the drop cable as well as the network side fiber cable typically connect to modules within the module. Even in fiber to the curb systems where coaxial cable is used to connect to the subscriber's premises, the network side module in the node may connect to the network fiber optic cable.

At the node, fiber optic cable or cables are connected to optic fiber connectors within the node. Damage to the fiber optic cable connectors may result from lax cleaning and maintenance practices, or when new additional modules are added or replaced within a node housing when subscribers are added or defective modules are replaced. In a fiber communication system, cleanliness in critically important in providing the best system performance possible. Dust and other contamination at the interface of the fiber cores (fiber core and core of module optical interface) causes performance degradation.

Accordingly, the connector interface must be as free as possible of contamination. As dirty fiber connectors are a common source of light loss at a node's optical module interface, cleaning of node connectors is an important maintenance activity to ensure that the changing and maintenance of a module or modules within a node does not lead to contaminate entry into the node and to migration to the optical connector. In cleaning module connectors, some typical items used include lint-free alcohol pads, alcohol saturated swabs, compressed air directed toward the connector and inspection a magnifying glass to inspect the connector ferrules.

To clean a connector that is inside a module, it is possible to remove the module from the node. However, this is undesirable because of the time cost incurred to disconnect optical and electrical cabling connected to the module and unscrewing the module from the node housing. Thus, it is desirable to have the module remain installed in the node housing. Some attempted solutions have included designing an optical module with a removable cover so that the module can remain installed in the housing while cleaning maintenance can be performed with the cover removed.

While the removable cover may provide access to the connectors, the number of fasteners that secure a cover to the rest of the module be high enough such that the time is consumed by maintenance personnel in removing the cover plate and reinstalling the cover. Not only is the time required high, based on the number of fasteners, but the screws, or similar fasteners, are often small, requiring time-consuming patience by maintenance personnel while removing, and trying to start each fastener into its corresponding hole following maintenance, while the module is still installed hanging from a aerial strand. Thus, there is a need for a module design that allows access to an optical connector enclosed therein for cleaning thereof without the need for either removing the module or removing an entire module side cover.

In addition, when a module is removed or replaced for maintenance purposes, an omega-shaped lifting ring is often inserted into holes in the module top corresponding to each leg of the ring. If the ring is inserted too far into the module, damage, including electrically shorting internal components, may occur. Thus, there is a need for a lifting mechanism that facilitates the lifting of the module from the node housing without potentially causing damage to internal components of the module.

SUMMARY

An objective of the invention is provide a movable window cover to facilitate removal of an optical connector from an optical fiber module. A rectangular window cover having a rectangular notch in a corner intended to be proximate the center of the module slides in a channel and is held the channel by an overhang of a cover that covers the side of the module. Thus, the notch forms two sides of a rectangular opening, the base of the module and the overlap of the side cover forming the other two.

A slot in the window cover allows a screw to pass there through and into corresponding threads on the other side of the cover formed into the base. When the screw is tightened against the window cover, the window cover is secured in place such that the optical connector may be secured to the module by flexible retaining clips affixed to opposing sides of the connector. To prevent withdrawal of the connector from the module, one of the retaining clips bears against one side of a shoulder formed into the base and the other bears against a first side of the window cover along an edge of the notch that is parallel to the shoulder. Ears on the opposing sides of the connector corresponding to the clips limit travel of the connector inward to the module. Such a connector is known in the art and is described herein for purposes of describing the cooperation of the various parts of the invention described more fully elsewhere herein. A removal tab at an end of the window cover opposite the notch may be used by personnel to slide the window cover along a guide channel, and when tightened against the window cover, may be used to remove, or insert, the module into the node housing in which it is used.

Generally described is an optical fiber module comprising a base for locating components internal to the module, the base defining a window and a movable means coupled to the base for covering the window. The movable means defining an opening for receiving an optical connector. The module may define an open side and have a removable means for covering the open side.

The window covering means may be slidably coupled to the base and may further comprise a means for fastening the window covering means to the base in a closed position. The fastening means may include a threaded screw or a spring loaded retaining clip.

The base may include a stop shoulder at a side of the widow proximate the center of the module for engaging, in cooperation with the window covering means, the connector to prevent its movement into the module. The window covering means may also include a removal tab at an end distal to the center of the module when the window cover means in a closed position.

DETAILED DESCRIPTION

As a preliminary matter, it readily will be understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof. Furthermore, while some aspects of the present invention are described in detail herein, other than details described elsewhere herein, no specific metallic, plastic or other material, housing or module chassis shape, or connector style, for example, is required to be used in the practicing of the present invention.

Figure 1:
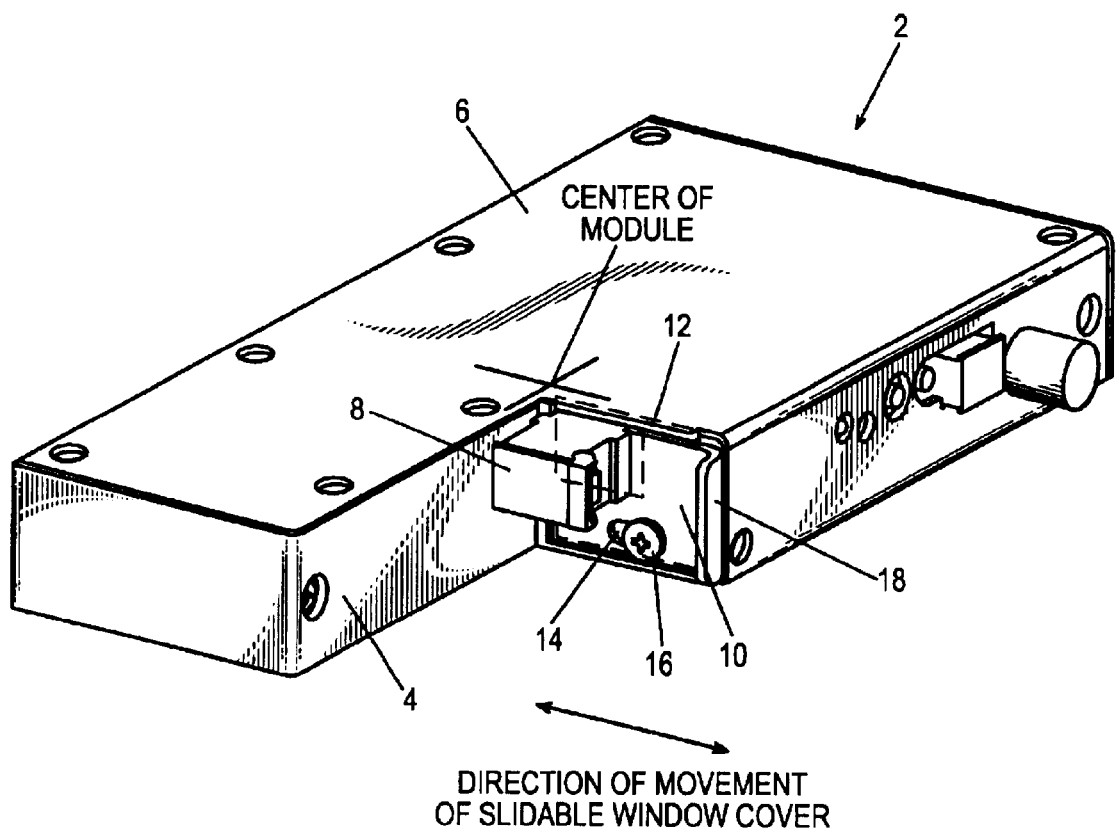
FIG. 1 illustrates a perspective view of an optical network module with cleaning slide.

Turning now to the figures, FIG. 1 illustrates a fiber optic module 2 for interfacing with an optical fiber. Base 4 is preferably cast from a strong and light material, such as aluminum. Base 4 provides structural rigidity to the module and provides a foundation for internal components, such as for example, amplifiers, optical fiber, electrical components, etc. In one aspect, base 4 is L-shaped having an open side, which may be covered with L-shaped module cover 6. It will be appreciated that module 2 could be otherwise shaped, but the cutout that creates the L-shape facilitates access to connector 8 and window cover 10 when the module is installed into a node housing.

Connector 8 provides an interface between network fiber external to the node and components inside module 2, and removal from the module may be required to facilitate cleaning of the connector. To avoid the need for removing a plurality of screws retaining cover 6 to base 4 in order to remove connector 8 from base 4, also preferably L-shaped window cover 10 may be designed to slide between the base and cover 6. The cutout in cover 10 allows penetration of and location of connector 8 into module 2 when window cover 10 is in a closed position. Base 4 may include a channel (not shown in the figure for clarity) in which window cover 10 may slide. Opposing the channel, module cover 6 includes overhang 12 that engages window cover 10 as it slides, thereby urging window cover 10 to remain in the channel as it slides therein.

Slot 14 and screw 16 cooperate to limit the range of sliding motion of window cover 10. Screw 16 passes through slot 14 and is coupled to matching threads formed within base 4. In addition, when screw 16 is tightened against window cover 10, sliding motion is prevented due to friction between the screw and the window cover. Accordingly, when screw 16 is loosened enough to allow sliding motion of window cover 10, the window cover may still be retained to base 4. This minimizes maintenance difficulty, because maintenance personnel need not be careful to avoid dropping screw 16 as it may remain attached to base 4, thereby retaining window cover 10 thereto. Although cover 10 may be retained with respect to module 2, window cover 10 may slide far enough so that connector 8 disengages from being retained by base 4 and window cover 10. The way connector 8 is preferably retained will be discussed in reference to FIGS. 2 and 3 infra.

In addition to slidable window cover 10 defining a cutout opening for locating connector 8, the slidable window cover may also include a removal tab 18 at an end distal to the center of module 2. Removal tab 18 provides a grip surface to facilitate sliding of cover 10. It will be appreciated that when module 2 is mounted into a typical node housing, tab 18 will be facing up when looking into the node. Thus, tab 18 may be used to push window cover 10 towards the center of module 2, or to pull cover 10 away from the center, thereby facilitating removal of connector 8. Furthermore, when screw 16 is fastened tightly such that window cover may not slide with respect to module 2, removal tab may also be used to push module into its position in the node housing, or to pull the module from the node housing when removal of the module is desired.

Figure 2:
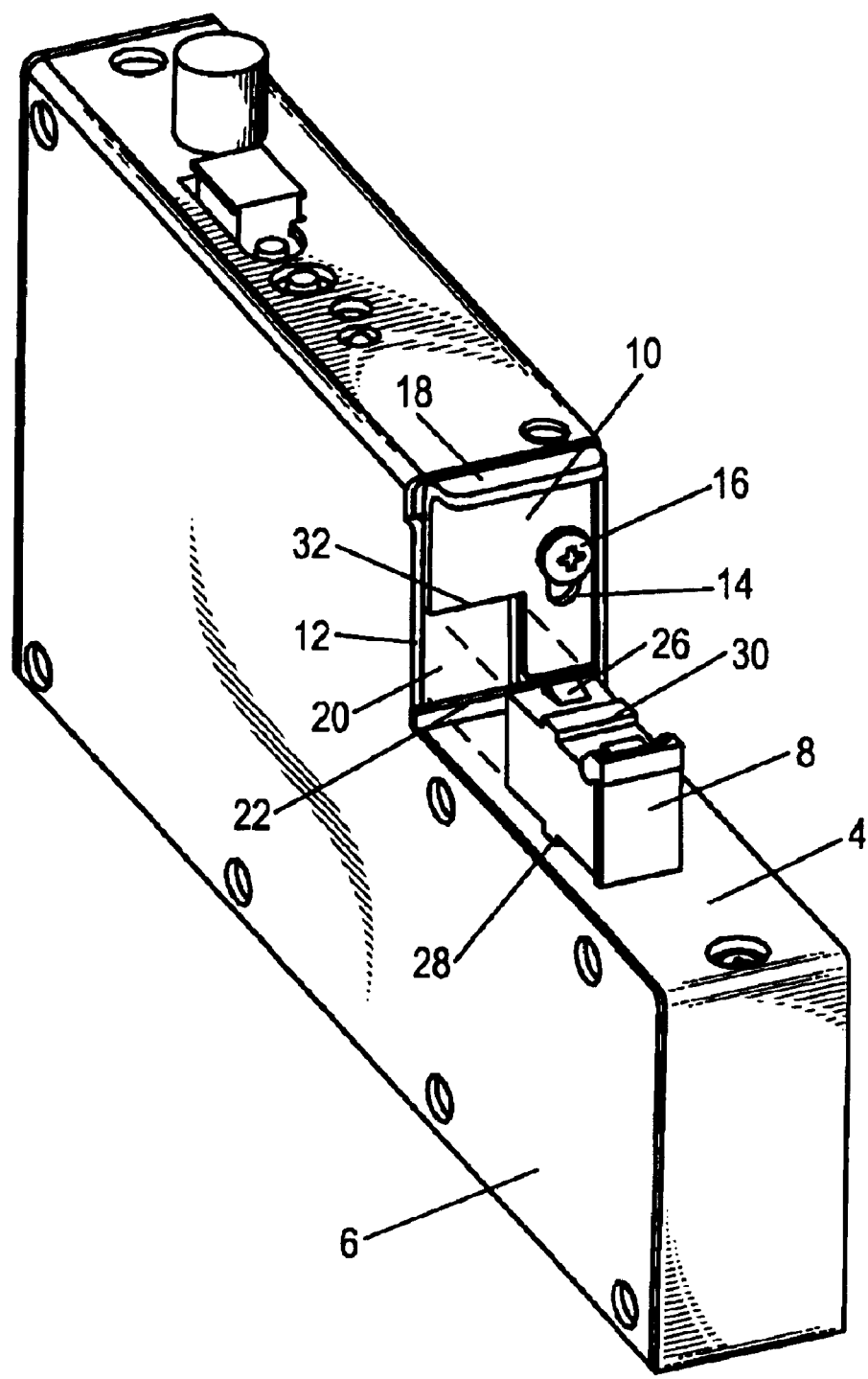
FIG. 2 illustrates an elevation view of the module cleaning slide with the module laying on its side, the optical connector being removed from the module.

Turning now to FIG. 2, a view of fiber optic module 2 is shown with connector 8 removed from connector opening 20. Window cover 10 is shown in the closed position, i.e., window cover 10 is in contact with stop shoulder 22 formed into base 4 such that connector 8 may be received through the opening 20 formed by window cover 10, stop shoulder 22 and overhang 12 of side module cover 6. In the closed position, screw 16 is typically tight against module cover 10 to prevent sliding of window cover 10 in channel 24.

When window cover 10 is in the closed position as shown, connector 8 may be inserted into opening 20 and retained therein by retaining clips 26. It will be appreciated that connector 8 will typically have a retaining clip 26 on two opposing sides of connector 8, but only one is shown for clarity. With reference to the drawing, the retaining clip that is not shown engages base 4 behind stop shoulder 22 and retaining clip 26 (shown) engages behind window cover 10 upon insertion of connector 8 into opening 20. When connector 8 is inserted into opening 20, the flexible tabs that make up retaining clips 26 move towards the body of the connector allowing it to be pushed through opening 20. When ear 28 mates with stop shoulder 22, and ear 30 mates with distal edge 32 of window cover 10, connector 8 is prevented from moving further into opening 20. Distal ends of the tabs on retaining clips 26 spring away from connector 8 when they have been pushed through opening 20 to prevent the connector from being pulled back out through opening 20. Thus, while window cover 10 remains in the closed position connector 8 is retained within opening 20.

When screw 16 is loosened, window cover 10 may be slid, preferably using removal tab 18, upward (as viewed in the figure) to remove connector 8 after it has been installed through opening 20. If window cover 10 is slid a distance enough that the lateral extent of retaining clips 26 is less that the lateral width of opening 20 (which will be greater when window cover 10 has been slid to the right as compared to the closed position), then connector 8 may be withdrawn from its corresponding module through opening 20. It will be appreciated that screw 16 need not be totally removed, indeed it is preferably left partially screwed into its corresponding threads. Thus, the likelihood that window cover 10 and/or the screw will be dropped is minimized. It will also be appreciated that connector 8 may be removed while side cover 6 remains installed.

Figure 3:
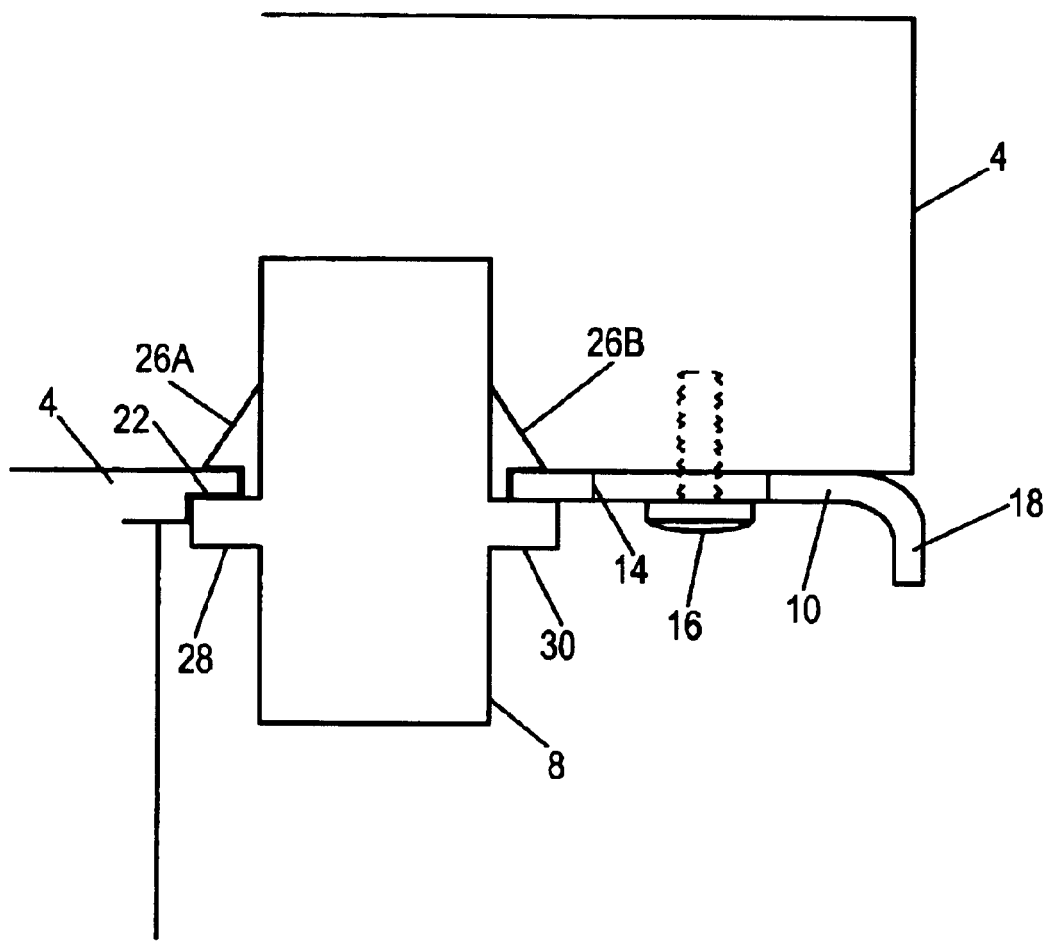
FIG. 3 illustrates a plan view of the optical cleaning slide with module laying on its side where the optical connector is installed and the module side cover is removed.

Turning now to FIG. 3, a plan view is shown looking at an aspect. This would be the same view if looking at the side of module 2, as shown in FIG. 1, with module cover 6 removed from base 4. Window cover 10 is shown in the closed position with screw 16 tightened against the cover; the hidden lines of slot 14 are shown with dashed lines. Ear 28 of connector 8 is shown mated against stop shoulder 22 and ear 30 is shown mated against window cover 10. It is noted that the thickness of base 4 in the area around stop shoulder 22 is thicker than window cover 10, the cover being in alignment with the projection of stop shoulder 22 from the base. This allows connector 8 to be aligned perpendicularly with the plane formed by shoulder 22 and the outer surface—with respect to the inside of the module—of cover 10. Thus, tabs 26 A and B can bear evenly against the inside of the projection of stop shoulder 22 and the inside of cover 10 respectively to maintain a solid fit of connector 8 within the module. Removal tab 18 is shown as having a curved J-hook shape, however other shapes may be implemented by those skilled in the art. It will be appreciated that connector 8 may be installed into a module with cover 10 in the closed position and screw 16 tightened there against.

These and many other objects and advantages will be readily apparent to one skilled in the art from the foregoing specification when read in conjunction with the appended drawings. While an L-shaped base and corresponding side cover, an L-shaped window cover and a J-shaped removal tab have been shown and described, it will be appreciated that these are only exemplary and other shapes and configurations for these and other components, as compared with the described and illustrated embodiments, may be implemented by those skilled in the art.

Furthermore, other fastening means, instead of a screw may be used to retain the window cover to the base, such as, for example, a spring-loaded tab or retaining clip that projects from the base and through the slot in the window cover when it is in the closed position. In addition, the optical connector illustrated in the preferred embodiment is of a type typically used in the relevant art, but other styles or shapes, such as, for example, round or rectangular with a continuous surrounding flange, rather than two ears on opposing sides, may be accommodated by the present invention with slight modification that will be readily apparent by those skilled in the art.

It is to be understood that the embodiments herein illustrated are examples only, and that the scope of the invention is to be defined solely by the claims when accorded a full range of equivalents.

What is claimed is:

1. An optical fiber module comprising:
    a base for locating components internal to the module, the base defining a window, and
    a movable means coupled to the base for covering the window, the movable means movable between open and closed positions, and the movable means defining an opening for receiving an optical connector when the movable means is in the closed position.

2. The module of claim 1 wherein the base defines an open side, the module further comprising a removable means for covering the open side.

3. The module of claim 1 wherein the movable means is slidably coupled to the base.

4. The module of claim 1 further comprising a means for fastening the movable means to the base in the closed position.

5. The module of claim 4 wherein the fastening means includes a threaded screw.

6. The module of claim 4 wherein the fastening means includes a retaining clip.

7. The module of claim 1 wherein the base includes a stop shoulder at a side of the widow proximate the center of the module for engaging, in cooperation with the movable means, the connector to prevent its movement into the module.

8. The module of claim 1 wherein the movable means includes a removal tab at an end distal to the center of the module.

9. An optical fiber module comprising:
    a base for locating components internal to the module, the base defining a window, the base further defining an open side;
    a removable means for covering the open side; and
    a movable means coupled to the base for covering the window, the movable means having open and closed positions, wherein the base, the removable covering means and the movable means define an opening for receiving an optical connector when the movable means is in the closed position.

10. The module of claim 9 wherein the movable means is slidably coupled to the base in a channel, the movable means being maintained in the channel by an overhang of the removable means.

11. The module of claim 9 further comprising a means for fastening the movable means to the base in a closed position.

12. The module of claim 11 wherein the fastening means includes a threaded screw.

13. The module of claim 11 wherein the fastening means includes a retaining clip.

14. The module of claim 9 wherein the base includes a stop shoulder at a side of the widow proximate the center of the module for engaging, in cooperation with the movable means, the connector to prevent its movement into the module.

15. The module of claim 9 wherein the movable means includes a removal tab at the end distal to the center of the module.

16. The module of claim 9 wherein the movable means is moved into the open position such that the optical connector may be removed from the module.

17. The module of claim 16 wherein the module remains installed in a node housing when the optical connector is removed.

18. The module of claim 1 wherein the movable means is moved into the open position such that the optical connector may be removed from the module.

19. The module of claim 18 wherein the module remains installed in a node housing when the optical connector is removed.

20. An optical fiber module comprising:
 a base having an opening configured for receiving an optical connector; and
 a movable window cover for covering the opening in the base, the movable window cover movable into open and closed positions wherein the optical connector may be received in the opening of the base when the movable window cover is in the closed position.

* * * * *